United States Patent [19]
Brown et al.

[11] Patent Number: 5,697,746
[45] Date of Patent: Dec. 16, 1997

[54] SCREW-NUT FASTENER ASSEMBLY

[75] Inventors: Robin L. Brown; Frank Piacenti, both of Campbellsville, Ky.; Douglas J. Soares, Land O'Lakes, Fla.; Frederick H. Stilwell, Fort Wayne, Ind.

[73] Assignee: Emhart Inc., Newark, Del.

[21] Appl. No.: 659,074

[22] Filed: Jun. 4, 1996

Related U.S. Application Data

[63] Continuation of Ser. No. 514,947, Aug. 14, 1995, abandoned.

[51] Int. Cl.⁶ .............................. F16B 23/00; F16B 35/06
[52] U.S. Cl. ..................... 411/396; 411/383; 411/387; 411/389; 411/410
[58] Field of Search ................................ 411/171, 178, 411/383, 384, 387, 396, 389, 402, 403, 404, 407, 410

[56] References Cited

U.S. PATENT DOCUMENTS

| | | | |
|---|---|---|---|
| 446,871 | 2/1891 | Lieb | 411/389 |
| 3,150,890 | 9/1964 | Sego et al. | 411/171 X |
| 4,342,530 | 8/1982 | Baker et al. | 411/374 |
| 4,636,125 | 1/1987 | Burgard | 411/410 X |
| 4,848,405 | 7/1989 | Albrecht | 411/178 |
| 5,074,729 | 12/1991 | Oga | 411/387 |
| 5,518,351 | 5/1996 | Peil | 411/396 X |

OTHER PUBLICATIONS

Elco Industries, Inc; Product Information Sheets; "Hanger Mate™ Threaded Rod Anchoring System"; Date: Prior to Jun. 1, 1994.

Neo Tek Inc.; Product Information Sheets; "Sammy Super Screw" Hanger Date: Prior to Jun., 1994.

Drawing of sample "Sammy Super Screw" Hanger Date: Prior to Jun., 1994.

Primary Examiner—Neill R. Wilson
Attorney, Agent, or Firm—E. D. Murphy

[57] ABSTRACT

A screw-nut fastener assembly in which a nut member is welded onto the head of a screw member having a variety of drive means, such as a straight slot, a cross recess drive or other suitable drive means.

7 Claims, 1 Drawing Sheet

SCREW-NUT FASTENER ASSEMBLY

This application is a continuation of applicaiton Ser. No. 08/514,947, filed Aug. 14, 1995, now abandoned.

BACKGROUND OF THE INVENTION

This invention relates to internally and externally threaded fasteners of the nut and screw variety.

Screw-nut fastener assemblies have been used for various reasons, primarily for the purpose of securing a nut in place on a work surface which can then anchor an auxiliary threaded member or bolt for various purposes, such as threaded rods, hanging mechanisms, sprinkler head assemblies and so on. In such fastener assemblies if the nut is secured to a screw member then it is only necessary to screw in the nut, so to speak, to thereby secure the assembly to the work piece; the nut portion then performs as an anchor for a suitably threaded auxiliary member as above described. In fabricating such screw-nut assemblies it has been found that the transition area from the one part to the other is often vulnerable to shear or breakage due to factors such as cross-sectional thinness of the mated parts; for example, the one part might be crimped to the other, or merely joined by the one part fitting within an aperture of the other, the through hole of the nut, for example. Shear and breakage can also occur when the means for driving the screw member is the hexagonal outer surface of the nut itself, which is commonly the case. There is a need therefore to provide a screw-nut assembly that exhibits superior strength, especially in the transition area between the screw and the nut member and, further, that such an assembly can be easily driven into the work piece.

SUMMARY OF THE INVENTION

It is a primary purpose and principle object of the present invention to address the aforementioned shortcomings and provide therefor a screw-nut fastener assembly which both exhibits superior strength, especially in the transition area between the screw and the nut member and which is easily and conventionally driven into the work piece.

It is another object of the present invention to provide a simple screw-nut fastener assembly that can be driven into a work piece without contacting or deforming the nut portion.

It is yet another object of the present invention to provide a variety of drive means associated with the driven member, i.e. the screw member itself, for driving the screw-nut fastener assembly into a work piece.

It is yet another object of the invention to provide a screw-nut fastener assembly which can be used with any number of materials such a structural steel, masonry, wood and plastics, and which requires only a simple one-step installation.

It is yet another object of the invention to efficiently provide an assembly of dissimilar materials and heat treatments of materials, such as (but not limited to) SAE 1022 steel case hardened drill screws to SAE 1010 non-case hardened prevailing torque flange nuts which has superior strength in the transition area between the screw and the nut members while enabling the screw to have the necessary material hardness for penetration and the nut to have the necessary material softness for flexing.

According to one embodiment of the invention there is provided a screw-nut fastener assembly in which a conventional nut member is welded onto a flat headed screw member, which may be of the self-drilling type; the screw member has a variety of drive means, such as a straight slot, a cross-recess drive or other positive drive means.

The invention will be better understood as well as further objects and advantages thereof become more apparent from the ensuing detailed description taken in conjunction with the drawing.

DESCRIPTION OF THE PREFERRED EMBODIMENT

Figure 1:
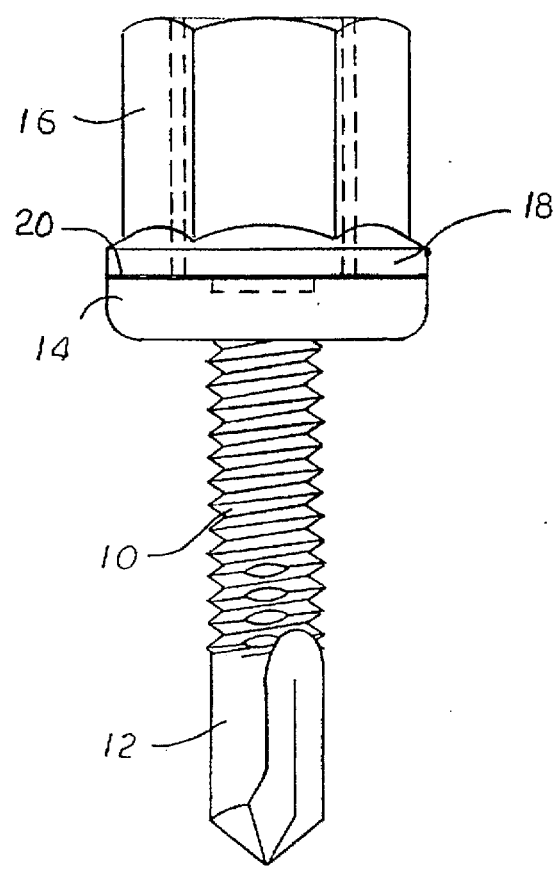
FIG. 1 is a schematic elevational view of the screw-nut fastener assembly according to the invention.
Figure 4:
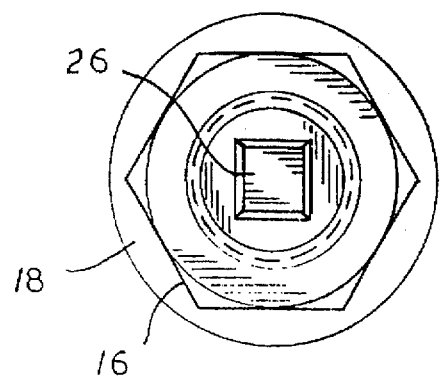
FIG. 4 is a schematic top plan view showing yet another form of drive for the screw-nut fastener assembly.
Figure 3:
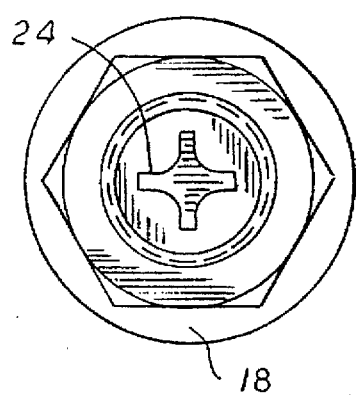
FIG. 3 is a schematic top plan view showing another form of drive.

Referring now to FIG. 1 there is shown a screw member 10, preferably of the self-drilling kind shown with a pilot drill point 12 and a flat circular head portion 14. Situated on top of the flat head portion of the screw is an internally threaded hexagonal flange nut 16 having a flat circular flange portion 18 at one end thereof which is shown to have the same outside diameter as the head 14 of the screw member. Although preferable, the respective diameters of nut and screw head need not be the same. In fact a larger diameter screw head might be desirable as a working platform for the weld, or vice versa. As shown, a weld 20 is disposed between the flange 18 of the nut member and the head of the screw member, such that the nut is firmly secured to the screw member so that its internal threads surround the screw drive, as seen in FIGS. 2-4.

Figure 2:
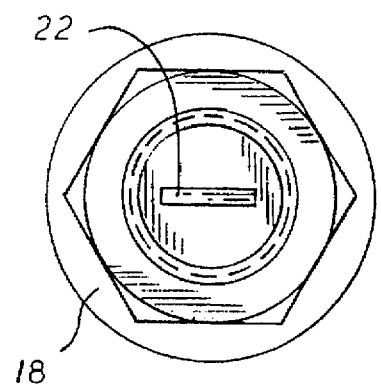
FIG. 2 is a schematic top plan view of the screw-nut assembly showing one form of drive.

In FIG. 2 the screw drive is shown to be a conventional straight slot 22. In FIG. 3 a conventional cross-recess drive 24 is shown, and in FIG. 4 a polygonal recess drive, such as the conventional square recess 26 is shown; of course, a variety of other drives having variously shaped recesses may also be used.

When so constructed, the screw-nut fastener assembly according to the invention can be easily installed by means of a screwdriver having a suitable drive tip without the need of a special wrench. All that is necessary is to place the drive member in the nut's internal diameter which can also act as a guide for the drive member, so that the drive member mates with the drive system in the head of the screw. Because of the weld connection between the nut and the screw, the nut is secured to the screw as if it were one with the screw, owning to the superior strength of the weld. In the preferred embodiment the weld joint, which in fact, is stronger than the screw, is located in the area where the greatest strain is encountered when the fastener assembly is operational, namely, at the transition from the nut to its anchor, the screw, in the work piece.

The present invention also makes it possible to fabricate screw-nut fastener assemblies using conventional or off-the-shelf components, nut and screw, without the need to forge, mold or cast new and different shapes that would be required if such fastener assemblies were fabricated from a single piece of material; or if using two separate parts, having to fabricate a special shape of the one part (nut or screw) with the other, or fabricate both, in order to join the two by means of crimping or other auxiliary means of attachment other than welding.

It is also noted that this invention may also be used in association with screws designed for use in materials other than metal. For example, this invention may use the screw thread design disclosed in US Pat. No. RE34,969, the disclosure of which is incorporated herein by reference, if the hanger is to be mounted in concrete or wood.

The foregoing relates to preferred exemplary embodiment of the present invention, it being understood that other embodiments and variants thereof are possible within the scope of the invention, the latter being defined by the appended claims.

We claim:

1. A screw-nut fastener assembly, comprising
   a screw member having a head portion, said head portion comprising a flat surface,
   drive means in said head portion,
   an internally threaded nut member surrounding said drive means, and
   a weld disposed between one end of said nut member and said head portion of said screw member; said one end of said nut member comprising a flat circular flange portion having the same outside diameter as said head portion, whereby said weld is disposed therebetween.

2. A screw-nut fastener assembly according to claim 1, wherein said drive means is a straight slot.

3. A screw-nut fastener assembly according to claim 1, wherein said drive means is a cross-recess head.

4. A screw-nut fastener assembly according to claim 1, wherein said drive means is a multi-sided recess.

5. A screw-nut fastener assembly according to claim 1, wherein said screw member is self-drilling type.

6. A screw-nut fastener assembly, comprising
   a screw member having a circular flat head portion,
   a recessed drive means in said head portion,
   an internally threaded hexagonal flange nut member surrounding said drive means,
   one end of said nut member having a flat circular flange portion, and
   a weld disposed between said flat circular flange portion and said flat circular head portion.

7. A screw-nut fastener assembly, comprising
   a screw member having a head portion,
   drive means in said head portion,
   an internally threaded nut member surrounding said drive means, said nut member comprising a hexagonal flange nut and
   a weld disposed between one end of said nut member and said head portion of said screw member.

* * * * *